US009739962B2

(12) United States Patent
Brenner et al.

(10) Patent No.: US 9,739,962 B2
(45) Date of Patent: Aug. 22, 2017

(54) PLASTIC OPTICAL FIBER DATA COMMUNICATION LINKS

(71) Applicant: Vixar, Plymouth, MN (US)

(72) Inventors: Mary Brenner, Plymouth, MN (US); Klein Johnson, Orono, MN (US); William Hogan, Minneapolis, MN (US); Dave Shelander, Roseville, MN (US)

(73) Assignee: Vixar, Plymouth, MN (US)

(*) Notice: Subject to any disclaimer, the term of this patent is extended or adjusted under 35 U.S.C. 154(b) by 0 days.

(21) Appl. No.: 14/120,306

(22) Filed: May 14, 2014

(65) Prior Publication Data

US 2014/0341506 A1 Nov. 20, 2014

Related U.S. Application Data

(60) Provisional application No. 61/822,957, filed on May 14, 2013.

(51) Int. Cl.
*G02B 6/42* (2006.01)

(52) U.S. Cl.
CPC ........... *G02B 6/428* (2013.01); *G02B 6/4214* (2013.01); *G02B 6/4225* (2013.01); *G02B 6/4257* (2013.01); *G02B 6/4278* (2013.01); *G02B 6/4284* (2013.01); *G02B 6/4281* (2013.01)

(58) Field of Classification Search
CPC .................................. G02B 6/42; G02B 6/428
USPC ........................................................... 385/31
See application file for complete search history.

(56) References Cited

U.S. PATENT DOCUMENTS

| | | | | |
|---|---|---|---|---|
| 4,595,839 A * | 6/1986 | Braun et al. | ................... | 250/551 |
| 5,112,127 A * | 5/1992 | Carrabba et al. | ............ | 356/301 |
| 5,778,122 A * | 7/1998 | Giebel et al. | ................... | 385/55 |
| 5,878,182 A * | 3/1999 | Peckham | ..................... | 385/123 |
| 6,142,650 A * | 11/2000 | Brown et al. | ................... | 362/259 |
| 7,221,828 B2 * | 5/2007 | Nakayama et al. | ............ | 385/49 |
| 7,329,054 B1 * | 2/2008 | Epitaux et al. | .................. | 385/89 |
| 9,024,224 B2 * | 5/2015 | Mase et al. | .................... | 209/587 |
| 9,158,071 B2 * | 10/2015 | Nishimura et al. | ............. | 385/16 |
| 2002/0136491 A1 * | 9/2002 | Ho | ................... | 385/33 |
| 2003/0072009 A1 * | 4/2003 | Domash et al. | ............. | 356/519 |
| 2003/0174977 A1 * | 9/2003 | Mayer et al. | ................. | 385/100 |
| 2004/0033039 A1 * | 2/2004 | Oliveti et al. | ................ | 385/123 |
| 2004/0247271 A1 * | 12/2004 | Skovgaard et al. | .......... | 385/125 |
| 2004/0258354 A1 * | 12/2004 | Sekiya et al. | .................. | 385/35 |
| 2005/0008310 A1 * | 1/2005 | Ohta et al. | .................... | 385/123 |
| 2005/0018264 A1 * | 1/2005 | Benedict | ....................... | 359/196 |
| 2005/0062181 A1 * | 3/2005 | Walker | .......................... | 264/1.24 |
| 2005/0180688 A1 * | 8/2005 | Ueno et al. | ..................... | 385/31 |
| 2005/0185900 A1 * | 8/2005 | Farr | ................ | 385/93 |
| 2005/0254008 A1 * | 11/2005 | Ferguson et al. | ............. | 351/205 |
| 2006/0110110 A1 * | 5/2006 | Yi et al. | .......................... | 385/93 |

(Continued)

FOREIGN PATENT DOCUMENTS

JP 20150010273 A1 * 2/2012 ............... G02B 6/32

*Primary Examiner* — Kaveh C Kianni
(74) *Attorney, Agent, or Firm* — Winthrop & Weinstein, P.A.

(57) ABSTRACT

Plastic optical fiber data communication links. Particularly, plastic optical fiber data communication links for embedded applications. More particularly, unique packaging approaches to constructing a very small, low cost, but high performance optical link, which may operate at 1 gigabits per second (Gbps) or faster.

16 Claims, 8 Drawing Sheets

(56) References Cited

U.S. PATENT DOCUMENTS

| | | | |
|---|---|---|---|
| 2006/0231771 A1* | 10/2006 | Lee et al. | 250/458.1 |
| 2006/0239605 A1* | 10/2006 | Palen et al. | 385/14 |
| 2007/0047885 A1* | 3/2007 | Mayer et al. | 385/114 |
| 2007/0077008 A1* | 4/2007 | Jeon et al. | 385/49 |
| 2007/0206907 A1* | 9/2007 | Mizoguchi et al. | 385/89 |
| 2008/0013896 A1* | 1/2008 | Salzberg et al. | 385/89 |
| 2009/0092365 A1* | 4/2009 | Donlagic | 385/124 |
| 2010/0157418 A1* | 6/2010 | Dong et al. | 359/341.3 |
| 2011/0108719 A1* | 5/2011 | Ford et al. | 250/262 |
| 2011/0268390 A1* | 11/2011 | Yi et al. | 385/50 |
| 2013/0130369 A1* | 5/2013 | Wilson et al. | 435/289.1 |
| 2013/0164828 A1* | 6/2013 | Dholakia et al. | 435/285.1 |
| 2013/0266262 A1* | 10/2013 | Nishimura et al. | 385/35 |
| 2014/0023327 A1* | 1/2014 | Smith et al. | 385/86 |
| 2014/0050490 A1* | 2/2014 | Giziewicz | 398/139 |
| 2014/0072311 A1* | 3/2014 | Giziewicz et al. | 398/135 |
| 2014/0099060 A1* | 4/2014 | Danley et al. | 385/38 |
| 2014/0270778 A1* | 9/2014 | Hui et al. | 398/79 |
| 2015/0010273 A1* | 1/2015 | Oyagi et al. | 385/33 |
| 2015/0362669 A1* | 12/2015 | Aizenberg et al. | 385/16 |

\* cited by examiner

US 9,739,962 B2

PLASTIC OPTICAL FIBER DATA COMMUNICATION LINKS

FIELD OF THE INVENTION

The present disclosure relates to plastic optical fiber data communication links. Particularly, the present disclosure relates to plastic optical fiber data communication links for embedded applications.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Fiber optic links have been applied to both long distance telecommunications and shorter distance data communication links within an enterprise. These links consist of a detachable optical fiber, with an electro-optical terminal (E-O terminal) at each end. Frequently these are duplex links, including both transmitter and receiver functionality at each E-O terminal. The major components conventionally include: a laser (in particular a Vertical-Cavity Surface-Emitting Laser (VCSEL)), the driver circuit, which is conventionally an integrated circuit (I.C.), for driving the laser, a photodetector that receives the light and converts it to an electrical signal, an integrated circuit for amplifying and digitizing the signal detected by the photodetector, and a circuit board on which the semiconductor components would be mounted. Commonly, the laser and photodetector may be packaged in a first level package before mounting on the circuit board. The I.C.s may also be in a first level package before attaching to the circuit board. The circuit board also needs to include an electrical connector that allows it to be plugged into and have electrical communication with a host circuit board. The transceiver also usually includes an optical connector that allows an optical fiber to be attached and detached, and to be properly aligned with respect to the laser and photodetector when it is attached. Finally, there is a housing that generally covers and incorporates all components. Due to high reliability and environmental demands, E-O terminals involve several layers of packaging. A typical duplex E-O terminal, or transceiver, for data communication applications might be 1 centimeter wide by 6 centimeters long by 0.5 centimeters high. More recently, the same functionality is achieved with an Active Optical Cable (AOC) in which the fiber is permanently attached to both of the E-O terminal ends.

As the data rates associated with the transfer of video reaches 10-40 Gbps, there has been increased interest in developing fiber optic links for consumer applications. Transmission distances over copper are limited, and the copper cable is rather thick and inflexible. For consumer applications, cost considerations play a very important role, and so new approaches are required in order to simultaneously achieve the both performance and cost requirements. There is also an interest in incorporating fiber optic links inside of consumer electronics, such as but not limited to, laptops, tablets, televisions, or phones in order to eliminate the effect of electro-magnetic interference from high speed signals being transferred along copper wires. However, the use of fiber-optic links in these embedded applications also requires a very small size, i.e., a few millimeters on a side. Many of these links can be simplex links, with information travelling in only one direction, requiring only a transmitter E-O terminal at one end, and a receiver E-O terminal at the other end. The fiber can also be permanently attached, forming an AOC.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous plastic optical fiber data communication links. Particularly, the present disclosure relates to novel and advantageous plastic optical fiber data communication links for embedded applications. Still more particularly, the various embodiments of the present disclosure relate to unique packaging approaches to constructing a very small, low cost, but high performance optical link, which may operate at 1 gigabits per second (Gbps) or faster.

Figure 1:
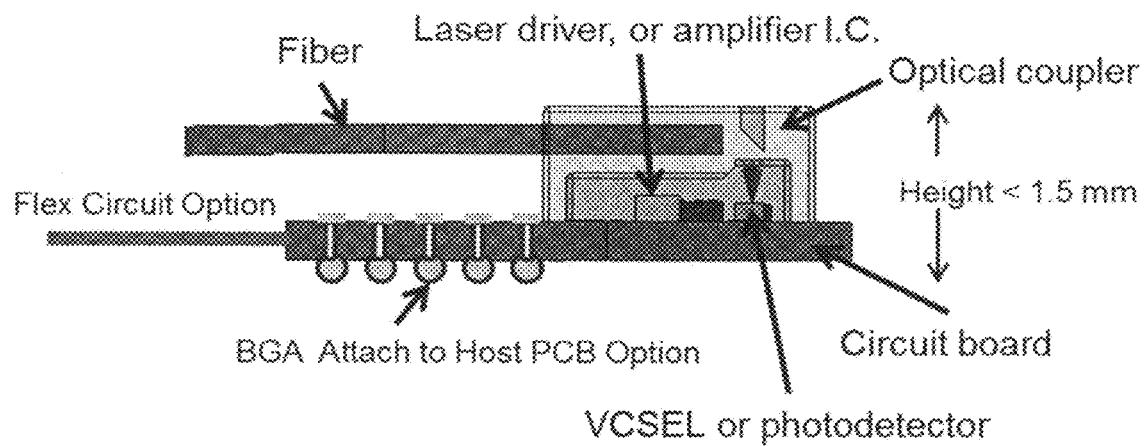
FIG. 1 is a schematic of an electro-optical terminal in accordance with one embodiment of the present disclosure.

FIG. 1 illustrates one end of the E-O terminal, which could be either a transmitter or a receiver. A transmitter may include: a laser, in particular a VCSEL, a driver circuit, which is an I.C. for driving the laser, a circuit board on which the laser and the driver I.C. are mounted, an optical coupler for coupling the laser light into the fiber, and an electrical connector for making the electrical connection from the transmitter to a host circuit board. The E-O terminal at the other end of the fiber may be a receiver and include: a photodetector that receives the light and converts it to an electrical signal, an I.C. for amplifying and digitizing the signal detected by the photodetector, a circuit board incorporating the photodetector and I.C. elements, an optical coupler that holds the fiber and directs the light to the photodetector, and an electrical connector for making the electrical connection to a host board. For both the transmitter and receiver, the active optical and electrical components are generally located on a circuit board. One configuration of this board has been designed to be as small as 2.2 mm×3.5 mm; however, any suitably-sized circuit board, either larger or smaller, may be utilized. For the transmitter end, the semiconductor components placed on the board may be a VCSEL and an I.C. used to drive the VCSEL. For the receiver end, the two chips may be a photodetector and an I.C. that includes transimpedance amplifier, or a circuit that incorporates a transimpedance amplifier and a limiting amplifier. Other circuitry could be included into these I.C.s as well, such as but not limited to, multiplexers or demultiplexers, or coding circuitry. In some embodiments, the VCSEL could be integrated onto the driver I.C. as a single die, and/or the photodetector could be incorporated into the amplifier I.C. as a single semiconductor die. Passive electrical components, such as resistors or capacitors may also be incorporated onto the circuit board.

Data may be transmitted from the transmitter to the receiver by electrically modulating the laser to produce a modulated optical output, coupling the laser light to an optical fiber, and coupling the light from the fiber to the photodetector at the other end that converts the optical signal to an electrical signal, and amplifying the electrical signal. The fiber could be made of silica glass or plastic. Plastic fiber has advantages of being flexible, with a small bend radius possible, and with easy termination of the fiber, e.g., it is easier to cut a plastic fiber end in a way that keeps the end of the fiber smooth for efficient coupling of light, than if the fiber were glass. The optical fiber may generally include a core, where the light travels, and a cladding having a smaller refractive index, which helps keep the light confined to the core. A typical core diameter might be around 100 µm to optimize the coupling from the laser and to the photodetector, but could range from about 50 µm to about 200 µm, or even smaller or greater if desired. The total fiber diameter, including the cladding, might typically be around 250 µm in diameter, but of course could also range from about 150 µm to about 500 µm, or even smaller or greater if desired. The light may be coupled from the VCSEL to the fiber, and from the fiber to the photodetector, with the help of a plastic molded coupler, or a plastic or metal machined coupler. As shown in FIG. 1, the fiber coupler may incorporate several features: 1) it may hold the fiber in a horizontal orientation, 2) it may contain a mirror, which turns the path of the light by 90 degrees, e.g., from being emitted vertically by the VCSEL into a horizontal direction, or by any other suitable angle, so it can be coupled into the fiber, and 3) it may provide one or more lenses that collect the laser light and focus it onto the face of the fiber. At the receiver end, the optical coupler may hold the fiber horizontally, and the mirror may direct the light from the fiber down onto the photodetector, with one or more lenses to focus the light onto the detector. In prior art, the fiber would be attached to an E-O terminal at one end of the board, i.e., on the right side of the embodiment in FIG. 1, with the electrical connector attached at the other side (e.g., left side in FIG. 1). However, in FIG. 1 the fiber comes from the left side, and extends over the part of the board making the electrical connection to the host board. This may make it easier to provide additional mechanical stabilization and strain relief to the fiber.

In FIG. 1, the circuit board may also incorporate a means for attaching the circuit board to a host board. Two options are illustrated in FIG. 1. A first option illustrates a Ball Grid Array (BGA) that can be attached with solder to a host board, forming a more or less permanent attachment. Another option shown is a flexible circuit board layer that extends out from the rigid board. Metal landing pads can be incorporated into the end of this flexible circuit which can be compatible with insertion into an electrical connector located on a host board. Alternatively, this flexible circuit could be attached to a host board using a hot bar process to limit the exposure of the plastic fiber and coupler to high temperature. Still another option, which is not illustrated in this figure, may include the use of a standard connector on the bottom of the board, allowing the circuit board to be plugged into a host board. Likewise, a compressible, anisotropic connector material could alternatively be used between the circuit board and the host board, allowing the board to be easily disconnected from and reconnected to the host board.

Figure 2A:
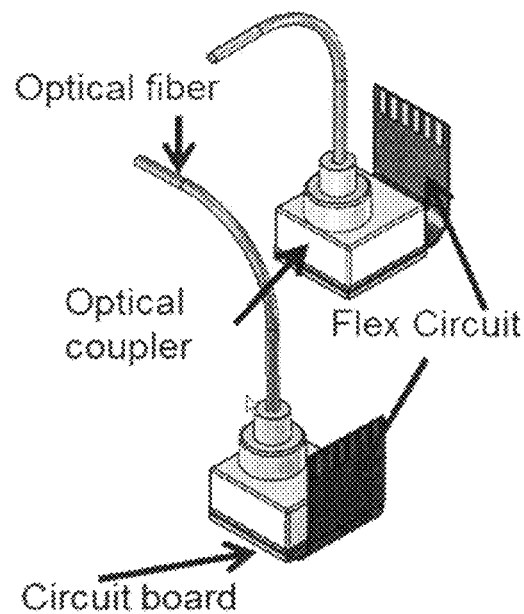
FIG. 2(a) is a isometric view of an electro-optical terminal in accordance with an embodiment of the present disclosure.
Figure 2B:
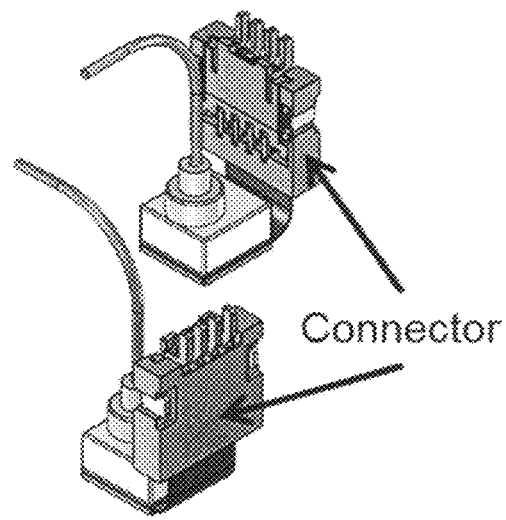
FIG. 2(b) is a isometric view of an electro-optical terminal in accordance with another embodiment of the present disclosure.
Figure 2C:
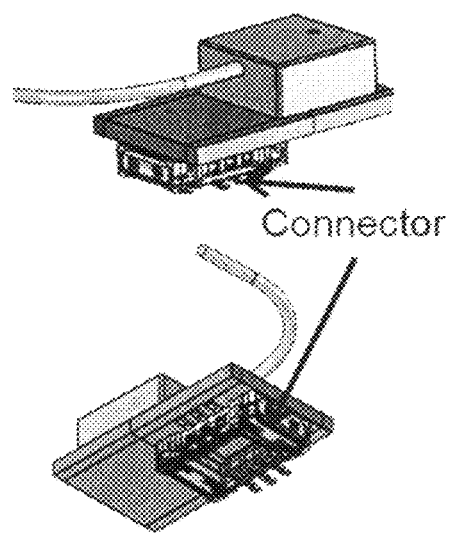
FIG. 2(c) is a isometric view of an electro-optical terminal in accordance with a further embodiment of the present disclosure.

Some alternatives for the electrical and optical connections to the E-O terminals are illustrated in FIGS. 2(a)-(c). FIG. 2(a) shows an embodiment where the fiber is attached to the terminal vertically through an optical coupler that can be, for example, molded plastic, cast metal, or machined plastic or metal. FIG. 2(a) also shows the board with a flexible circuit extension with metal landing pads on the flexible circuit for attachment to a connector. FIG. 2(b) illustrates the terminal design of FIG. 2(a) attached to a connector. FIG. 2(c) illustrates the E-O terminal with an electrical connector mounted on the bottom side of the board for attachment to the host board.

Figure 3A:
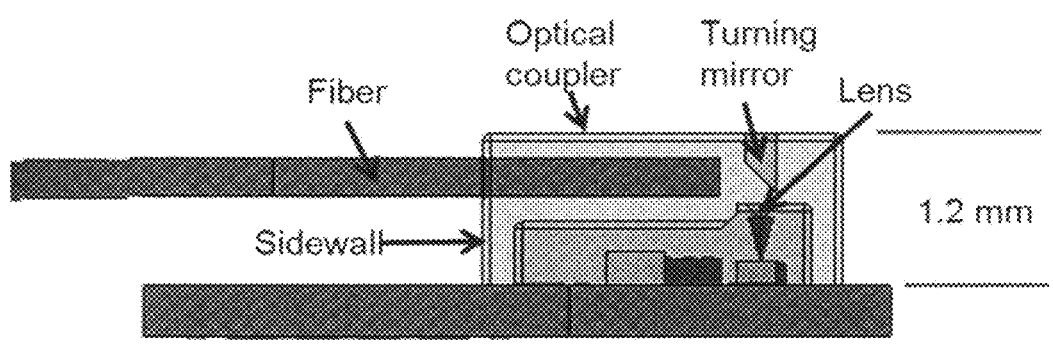
FIG. 3(a) is a schematic view of an electro-optical terminal in accordance with still another embodiment of the present disclosure.
Figure 3B:
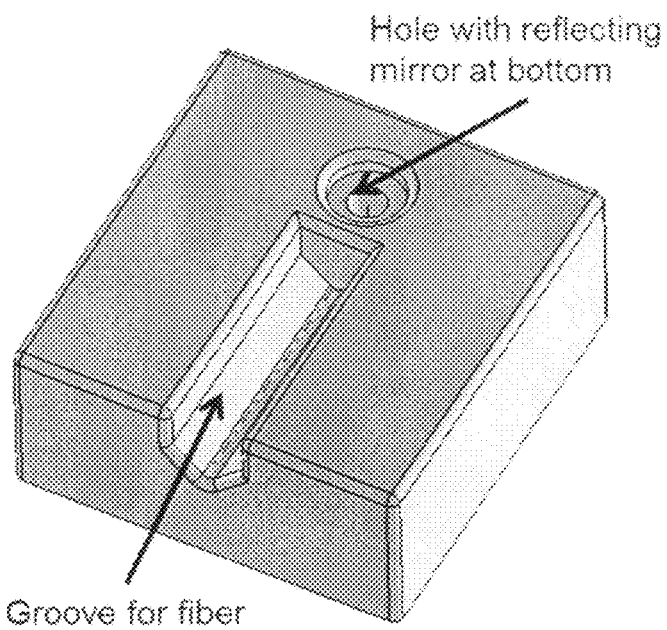
FIG. 3(b) is an isometric top view of an electro-optical terminal in accordance with an embodiment of the present disclosure configured as a transmitter.
Figure 3C:
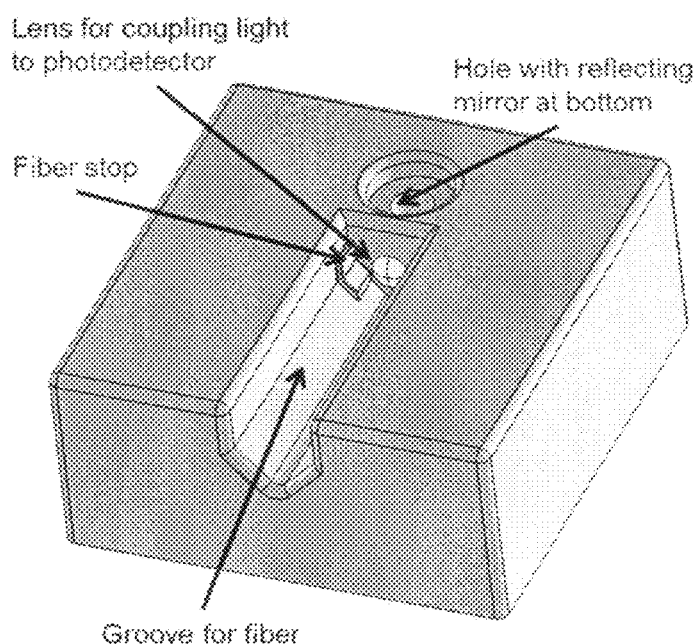
FIG. 3(c) is an isometric top view of an electro-optical terminal in accordance with an embodiment of the present disclosure configured as a receiver.
Figure 3D:
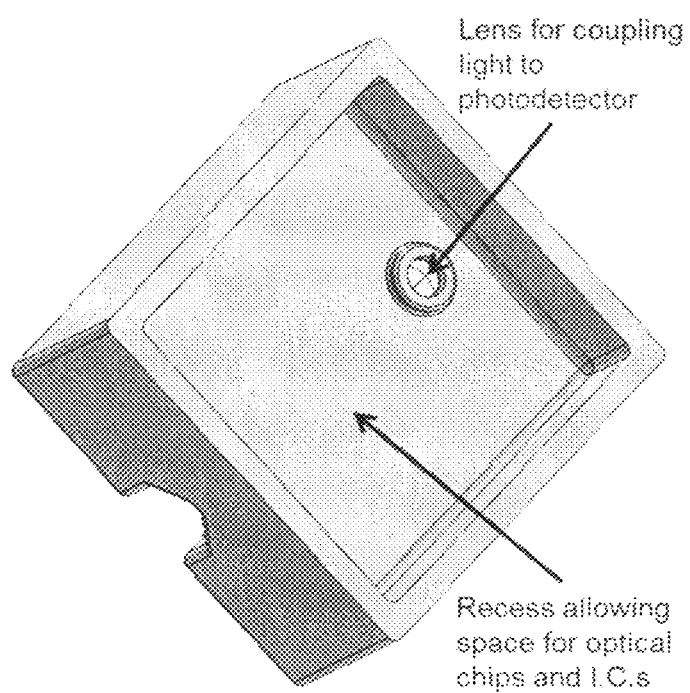
FIG. 3(d) is an isometric bottom view of an electro-optical terminal in accordance with the embodiments of FIGS. 3(c) and (d).

FIG. 3(a) shows a coupler similar to that of FIG. 1, but points out the location of some of the described features. In one embodiment, the sidewalls may completely or substantially surround the VCSEL/photodetector and I.C.s, including the wire bonds used to connect to each other and the board. The fiber may be attached to a groove in the top surface, and a surface located at a 45 degree angle to the fiber may serves as a 90 degree turning mirror. Below the turning mirror may be located a lens which focuses the light from the VCSEL into the fiber or from the fiber onto the photodetector, as the case may be. For the receiver E-O terminal, the optical coupler may also include a second lens located at the surface nearest the fiber. FIG. 3(b) illustrates a top surface of an optical coupler, such as the one illustrated in FIG. 3(a), for a transmitter E-O terminal. The optical coupler may be made of an optical quality polymer material, such as but not limited to, Ultem, but could be any number of suitable materials or combination of materials. The groove used for locating the fiber may be visible in some embodiments, such as illustrated in FIG. 3(b); however, this need not be the case. The fiber could be placed in the groove and pushed to the wall at the end of the grove and epoxied in place. The position of this wall relative to the turning mirror may be chosen to control the optical path length. The circular hole visible on the top surface may reach down to form a turning mirror which is at, for example, a 45 degree angle to the fiber surface. FIG. 3(c) illustrates a top surface of an optical coupler, such as the one illustrated in FIG. 3(a), for a receiver E-O terminal. In this embodiment, two additional features may be seen. At the end of the fiber groove a lens may be provided. This is because the light leaving the fiber comes out at an angle and should desirably have its angle reduced in order to transfer the light efficiently to the photodetector. In addition, a stop for the fiber may be included before the end of the groove that maintains the proper distance (e.g., the focal length) between the fiber end and the lens. FIG. 3(d) illustrates a bottom side of an optical coupler, such as the one illustrated in FIG. 3(a), which may be very similar for both the transmitter and receiver E-O terminals. A recessed surface on this side can allow space for the laser or photodetector and I.C. chips to be located under the coupler. A lens may be positioned and/or molded on this side to enable the optical coupling from the VCSEL to the fiber, or from the fiber to the photodetector. The height of the recessed surface, as well as the distance between the lens and the turning mirror may be chosen to conform to the overall optical design, which will be described in further detail below. The lens prescription may be slightly different for the transmitter and receiver E-O terminals. A ridge may be provided substantially around the lens to help prevent damage to the lens.

In one embodiment, many, all, or substantially all of the optically important surfaces, i.e., the lenses and the turning mirror, may be protected, by, for example but not limited to, recessing them sufficiently below the surface, or providing an additional ridge around them, to protect them from damage. Without such feature(s), couplers of the present disclosure may need to be kept separate from one in another, such as in trays, for instance, so they don't scratch one another, driving up handling costs. With this feature(s), however, the couplers of the present disclosure could be simply thrown together, such as in bags, without damage. Accordingly, the described protection feature(s) can minimize or reduce the cost of handling.

Figure 4:
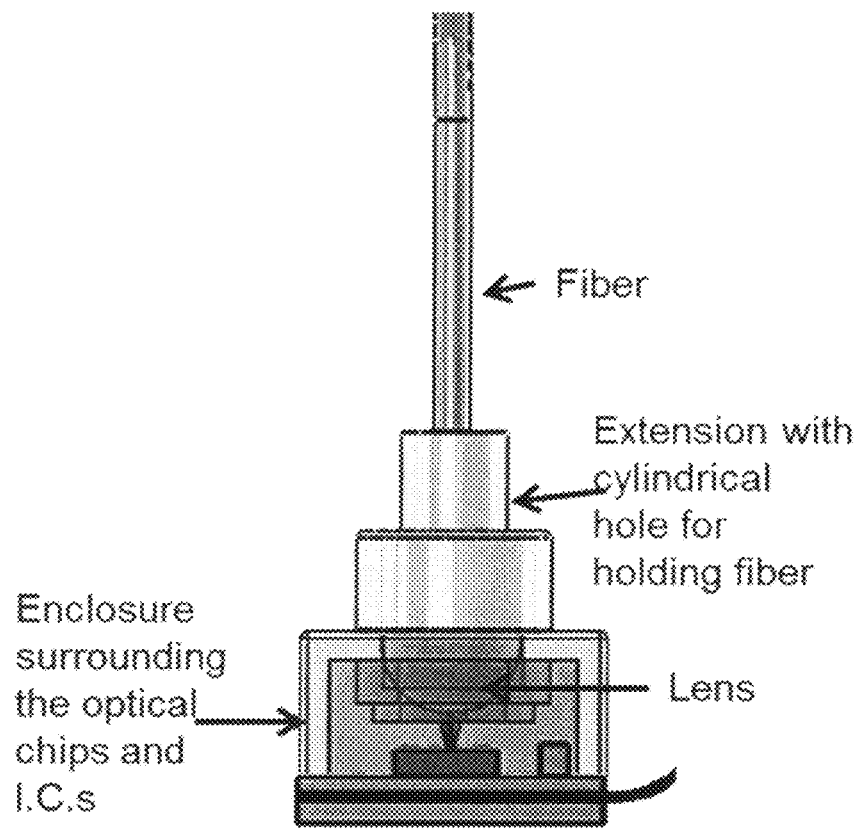
FIG. 4 is a schematic of an electro-optical terminal in accordance with yet another embodiment of the present disclosure.

An alternative optical coupling mechanism is illustrated in FIG. 4. In this embodiment, the optical coupler may be placed on a circuit board and also form an enclosure around the area of the circuit board where the optical chip and I.C.s may be located. A lens may be incorporated on the inside of the enclosure directly above the optoelectronic chip, e.g., the VCSEL or the photodetector. On the outside of the enclosure, an extension may be included that may contain a cylindrical hole into which the fiber can be inserted. A stop may be included that maintains the proper distance between the end of the fiber and the lens. This could be, for example, an extra ridge extending from the walls of the cylinder, or could just be a wall between the lens and the cylindrical hole for the fiber. In this embodiment, the fiber may be held with its axis perpendicular to the board, so no turning mirrors are required. In a transmitter, the light from the VCSEL can travel in a path perpendicular to the board, through the coupler, and directly into the end face of the fiber. Likewise, in a receiver, the light from the fiber can travel in a path perpendicular to the board, through the coupler, and directly into the photodetector. The coupler may be, but is not limited to, molded in plastic. Alternatively, for example, the coupler could be machined or cast in metal. The lens could be, for example, a glass machined, glass molded, or plastic molded plano-convex lens, or could be a plastic or glass ball lens. The enclosure could be a layer of circuit board, or could be a spacer made of plastic, ceramic, glass, metal, or any other suitable material or combination of materials. The thickness of the spacer or enclosure may be chosen to be consistent with the optical design.

Figure 5A:
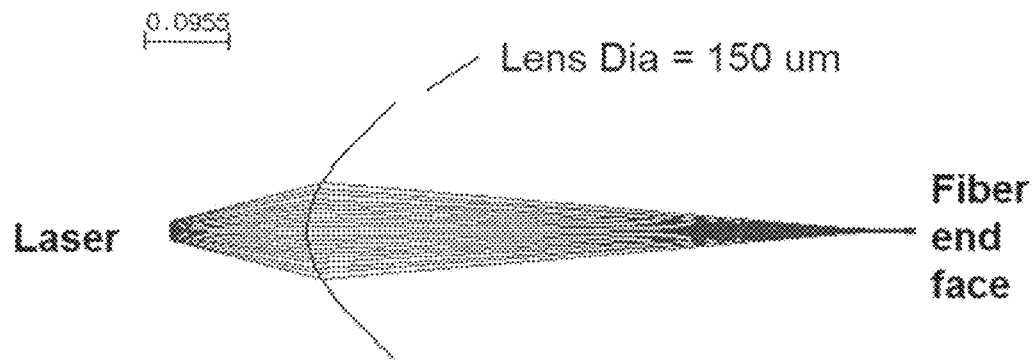
FIG. 5(a) provides an optical design for an electro-optical terminal in accordance with an embodiment of the present disclosure on a transmitter side.

FIG. 5(a) illustrates a version of an optical design for an optical coupler of the present disclosure on the transmitter side. The turning mirror is not illustrated, but its incorporation would not change the optical design, and the turning mirror can be placed anywhere in the path between the lens and the fiber. The optical design focuses the output of the laser into a small spot (about 20 μm) onto the face of the fiber. Since the fiber core is 80-120 μm, this allows for 20-50 μm of alignment tolerance. This can be desirable, in that the assembly can be built with alignment tolerances available from optical molders, and by using a vision system to place the die and the coupler on the board. Active alignment, i.e., alignment of the coupler with the optical devices activated in order to actively measure the best coupling, is not required.

Figure 5B:
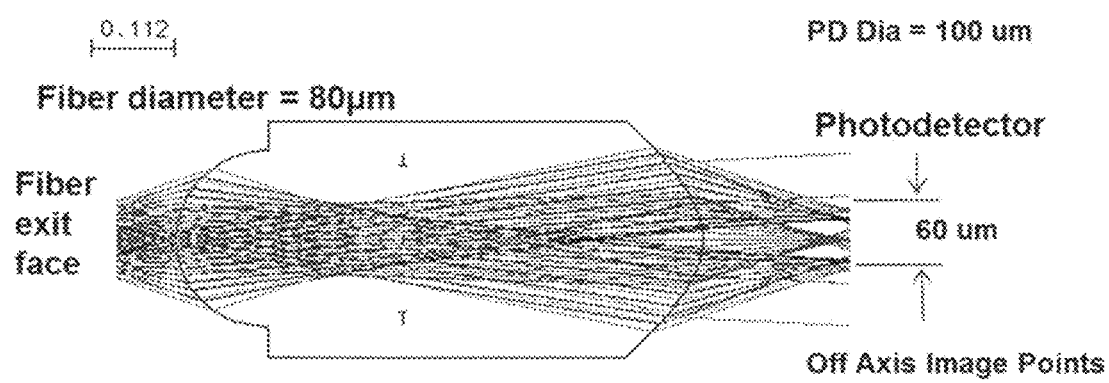
FIG. 5(b) provides an optical design for an electro-optical terminal in accordance with an embodiment of the present disclosure on a receiver side.

FIG. 5(b) illustrates a version of an optical coupler of the present disclosure at the receiver end. Once again, the turning mirror is not shown, but can be incorporated anywhere between the two lenses shown without affecting the optical design. This modeling assumes that the fiber diameter is 80 μm, and the light exits the fiber from anywhere within the core. The first lens collimates the light, and the second lens focuses the light onto the photodetector. The light emitted from the center of the fiber is transmitted straight through the optical path, but the light leaving the fiber closer to the edge of the fiber core is transmitted thought the coupler at an angle, and then focused to a slightly different spot on the photodetector. However, the modeling indicates that almost all the light is focused within a spot 60 μm in diameter. With a 100 μm diameter photodetector, for example, this allows +/−20 microns of radial alignment tolerance. Again, this makes it possible to assemble the receiver E-O terminal using moderate precision die placement tools and plastic molded couplers. These optical design considerations may be very desirable for creating an overall low-cost design.

In some embodiments, a metal shield can be created that covers the entire E-O terminal at each end to provide protection from EMI and lower EMI emissions.

Manufacturing and assembly of the E-O terminals could generally be performed as follows. Circuit boards incorporating the connections between the different semiconductor die and to the electrical connections to the host board could be designed and manufactured using standard circuit board techniques. The semiconductor die, along with any passive components, such as capacitors or resistors, could be placed on the board using die bonders with moderate (3-25 μm) placement accuracy. The attachment can be made through solder re-flow or a conductive epoxy. If a connector is to be incorporated into the board, this could also be attached through a solder reflow or epoxy process. After the components are attached to the board, additional wire bonding could be performed to connect the surfaces of the die to each other or contact pads on the board. The optical coupler could then be placed on the board, again using a moderate precision die bonder, and attached in place using, for example, epoxy. The fiber could then be placed in the v-groove on the optical coupler and also attached with, for example, an epoxy. When the fiber is attached to both of the E-O terminals, the assembly of the active optical cable may be complete. The AOC can be attached to the host boards by plugging in to the other side of the connector in the case of a connector, or using a hot bar or solder in the case of a ball grid array, or by placing the anisotropic compression connector between the E-O terminal and the host board and supplying a fixture which provide pressure to the top side of the E-O terminal. Strain relief for the fiber could be incorporated and the EMI shield could also be placed over the terminal. The EMI shield could be designed to create a pressure to press the AOC E-O terminals against the host board in the case of the anisotropic compression connection.

A variety of embodiments have been disclosed. While not limited to any specific embodiment, certain embodiments may be particularly advantageous, and are described below. Although described as separate embodiments herein for ease of explanation, any one or more of the below described embodiments could be separate embodiments or part of the same embodiment. One embodiment may include a combination of a chip on-board E-O terminal with a flexible small bend radius plastic optical fiber to create an embedded active optical cable. The coupler may further include a 680 nm VCSEL (with a range of generally 650-700 nm) or a 775 nm VCSEL (with a range of generally 760-790 nm) VCSEL as the light generating source. Still further, the coupler may include a fiber with a doping that reduces the optical loss at about 670-700 nm, and at about 760-790 nm. Another embodiment may include a combination of a fiber diameter between about 80-120 µm and a photodetector diameter of between about 80-150 µm, wherein the optical design of the optical coupler permits the active optical cable to be assembled without active alignment. A further embodiment may include an optical coupler that holds the fiber horizontal to the E-O terminal circuit board, where the fiber is directed toward the same end of the board as where the electrical connection is located, thereby providing better mechanical stability for the fiber. Still another embodiment may include an optical coupler that provides an enclosure around the VCSEL, driver I.C. and associated wire bonds, a lens for reducing the beam divergence of the VCSEL, a turning mirror, and a groove for holding a plastic or glass optical fiber. In a further embodiment, an optical coupler may provide a groove for holding the fiber, a stop feature within the grove that maintains the proper distance between the fiber and lens, a lens that collimates the beam leaving the fiber, a turning mirror to turn the beam about 90 degrees, a second lens that focuses the light down onto the photodetector, and an enclosure around the photodetector, amplifier, and associated wire bonds. In particular embodiments, the optical surfaces of the optical coupler, e.g., the lenses and the turning mirrors, are all protected, either by recessing them from the surface, or adding a ridge around them. Another embodiment includes an optical coupler for coupling into a fiber leaving the E-O terminal in a perpendicular direction, comprising a spacer layer and an extension that holds the lens on one end, and further provides a cylindrical hole on the other side for holding the fiber so that it is aligned to the lens and kept at the proper distance from the lens. The lens could be a plastic or glass ball lens, or a plastic or glass convex or plano-convex lens. The spacer layer could be a circuit board layer of a suitable thickness, laminated to the rest of the board, or could be a spacer with a hole in the middle that is molded or machined plastic or ceramic, cast or machined metal, or molded glass. In some embodiments, an anisotropic compressible connector is used to connect the terminals of an AOC to the host board. In other embodiments, a flex circuit extension from the E-O terminal circuit board is used to form a connection by insertion into a connector on the host board. In other embodiments, a flex circuit extension from the E-O terminal circuit board is used to form a connection by attaching the electrical terminals on the flex circuit to the host board using a solder reflow or hot bar attachment process.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:
1. An electro-optical coupler comprising:
   a vertical-cavity surface-emitting laser (VCSEL) for emitting laser light;
   a driver integrated circuit for driving the VCSEL;
   a circuit board on which the VCSEL and the driver integrated circuit are mounted, the circuit board having a first attachment face and a second attachment face opposing the first attachment face, wherein the VCSEL and the driver integrated circuit are mounted on the first attachment face;
   an optical coupler configured to receive a plastic optical fiber having a core diameter greater than 80 µm and couple the laser light into the optical fiber, the optical coupler comprising an optical lens design that focuses the laser light from the VCSEL to a spot diameter of substantially 20 µm onto a face of the optical fiber, when coupled with the optical fiber; and
   an electrical connector for making an electrical connection to a host circuit board, the electrical connector arranged on the second attachment face of the circuit board.

2. The electro-optical coupler of claim 1, wherein the VCSEL has a range of about 650-700 nm.

3. The electro-optical coupler of claim 1, wherein the VCSEL has a range of about 760-790 nm.

4. The electro-optical coupler of claim 2, further coupled with the optical fiber, the optical fiber having a doping that reduces the optical loss at about 670-700 nm.

5. The electro-optical coupler of claim 3, further coupled with the optical fiber, the optical fiber having a doping that reduces the optical loss at about 760-790 nm.

6. The electro-optical coupler of claim 1, wherein the optical coupler is configured for coupling with the optical fiber, such that the optical fiber leaves the electro-optical coupler in a direction substantially parallel to the host circuit board, when connected therewith.

7. The electro-optical coupler of claim 1, wherein the optical coupler is configured to receive an optical fiber having a core diameter of at least 100 μm.

8. The electro-optical coupler of claim 1, wherein the optical coupler comprises a recess for protecting the optical lens.

9. The electro-optical coupler of claim 1, wherein the optical coupler comprises a ridge for protecting the optical lens.

10. An electro-optical coupler comprising:
- a photodetector with a diameter between about 80-150 μm that receives light and converts it to an electrical signal;
- an integrated circuit for amplifying and digitizing the electrical signal from the photodetector;
- a circuit board incorporating the photodetector and integrated circuit, the circuit board having a first attachment face and a second attachment face opposing the first attachment face, wherein the photodetector and the integrated circuit are arranged on the first attachment face;
- an optical coupler configured for holding a plastic optical fiber having a core diameter greater than 80 μm and directing light from the optical fiber to the photodetector, the optical coupler comprising an optical lens design that focuses the laser light from the optical fiber, when coupled with the optical fiber, to substantially 60 μm onto the photodetector; and
- an electrical connector for making an electrical connection to a host circuit board, the electrical connector arranged on the second attachment face of the circuit board.

11. The electro-optical coupler of claim 10, wherein the optical coupler is configured for coupling with the optical fiber, such that the optical fiber leaves the electro-optical coupler in a direction substantially parallel to the host circuit board, when connected therewith.

12. The electro-optical coupler of claim 10, wherein the optical coupler is configured for holding an optical fiber having a core diameter of at least 100 μm.

13. An electro-optical coupler comprising:
- a vertical-cavity surface-emitting laser (VCSEL) for emitting laser light;
- a driver integrated circuit for driving the VCSEL;
- a circuit board on which the VCSEL and the driver integrated circuit are mounted, the circuit board having a first attachment face and a second attachment face opposing the first attachment face, wherein the VCSEL and the driver integrated circuit are mounted on the first attachment face;
- an optical coupler configured to receive a plastic optical fiber having a core diameter greater than 80 μm and couple the laser light into the optical fiber, the optical coupler comprising an optical lens design that focuses the laser light from the VCSEL to a spot diameter onto a face of the optical fiber, when coupled with the optical fiber, with an alignment tolerance of at least 20 μm, such that the optical coupler, VCSEL, and circuit board can be assembled and aligned without active alignment of the coupler and VCSEL; and
- an electrical connector for making an electrical connection to a host circuit board, the electrical connector arranged on the second attachment face of the circuit board.

14. The electro-optical coupler of claim 13, wherein the optical coupler is configured to receive an optical fiber having a core diameter of at least 100 μm.

15. The electro-optical coupler of claim 13, wherein the optical coupler comprises a recess for protecting the optical lens.

16. The electro-optical coupler of claim 13, wherein the optical coupler comprises a ridge for protecting the optical lens.

* * * * *